United States Patent [19]

Augustine et al.

[11] Patent Number: 4,775,545

[45] Date of Patent: Oct. 4, 1988

[54] PROCESS FOR PRODUCING SWEETENED FRUIT

[75] Inventors: Michael E. Augustine; Jane L. Dunn; Donald W. Lillard; Carol A. O'Brien; Walter C. Yackel, all of Decatur, Ill.

[73] Assignee: Staley Continental, Inc., Rolling Meadows, Ill.

[21] Appl. No.: 25,132

[22] Filed: Mar. 12, 1987

[51] Int. Cl.$^4$ .............................................. A23B 7/08
[52] U.S. Cl. .................................... 426/639; 426/640
[58] Field of Search ......................... 426/639, 640, 302

[56] References Cited

U.S. PATENT DOCUMENTS

| | | | |
|---|---|---|---|
| 1,089,215 | 3/1914 | Heine | 426/639 |
| 1,853,151 | 2/1932 | Segur et al. | 426/302 |
| 3,356,512 | 12/1967 | Lemaire et al. | 99/204 |
| 3,800,049 | 3/1974 | Larroche et al. | 426/639 |
| 3,952,112 | 4/1976 | Fulger et al. | 426/321 |
| 4,103,035 | 7/1978 | Fulger et al. | 426/302 |
| 4,256,772 | 3/1981 | Shanbhag et al. | 426/331 |
| 4,341,803 | 7/1982 | Koshida et al. | 426/242 |
| 4,350,711 | 9/1982 | Kahn et al. | 426/102 |
| 4,364,968 | 12/1982 | Waitman et al. | 426/639 |
| 4,390,550 | 6/1982 | Kahn et al. | 426/102 |
| 4,452,033 | 9/1985 | Agarwala | 426/321 |
| 4,551,348 | 11/1985 | O'Mahony et al | 426/639 |
| 4,626,434 | 12/1986 | O'Mahony et al. | 426/50 |

FOREIGN PATENT DOCUMENTS 1021991  12/1977  Canada ................................ 426/302

OTHER PUBLICATIONS

Bolin, H. R., et al. "Effect of Osmotic Agents and Concentrations on Fruit Quality", Journal of Food Science 48(1):202–205 (1983).

Huxsoll, C. C., "Reducing the Refrigeration Load by Partial Concentration of Foods Prior to Freezing", Food Technology, May, 1982, pp. 98–102.

"Crystalline Fructose: A Breakthrough in Corn Sweetener Process Technology" Food Technology, Jan. 1987, pp. 66, 67 and 72.

Primary Examiner—Donald E. Czaja
Assistant Examiner—Mary S. Mims
Attorney, Agent, or Firm—J Daniel Wood; Michael F. Campbell; James B. Guffey

[57] ABSTRACT

A sweetened fruit having a low water activity relative to its moisture content is prepared by bathing a dry fruit in an aqueous sugar solution having about 70 to 95 weight percent sugar, at least about 75 weight percent of which is fructose.

16 Claims, No Drawings

PROCESS FOR PRODUCING SWEETENED FRUIT

FIELD OF THE INVENTION

This invention relates to sweetened fruit. More particularly, this invention relates to a process for preparing sweetened fruit having a low water activity relative to its moisture content.

BACKGROUND OF THE INVENTION

Fruits have been preserved against microbial spoilage by drying to very low moisture levels since time immemorial. It is now known that microbial spoilage is a function of water activity rather than moisture content. Water activity is the ratio of the vapor pressure of water in a material to the vapor pressure of pure water at the same temperature. Microorganisms have limits on their ability to prevent the loss of water from their cells and, if the water activity of their environment is too low, the cells cannot regulate the water loss and either become dormant or die. For example, few bacteria can survive at water activities less than about 0.85, few yeasts can survive at activities less than about 0.80, and few molds can survive at activities less than about 0.71.

In addition to its role in microbial spoilage, the water activity of a fruit is important when the fruit is used in products such as breakfast cereals. The cereal flakes, commonly derived from corn, wheat, rice, or other grains, are generally very dry and crisp with moisture contents of less than about 5.0 weight percent and water activities of less than about 0.5. If a fruit having a water activity higher than that of the flakes is mixed with the flakes, there will be a transfer of water from the fruit to the flakes, causing the flakes to become soggy. Accordingly, to retard or eliminate microbial spoilage and to reduce or eliminate the flow of water to the cereal flakes, fruits having low water activities are used in breakfast cereals. To date, the primary means for obtaining a fruit with a low water activity is to dry it to a low moisture level.

The use of extremely dry fruit in breakfast cereals is not without disadvantages. Extremely dry fruit tend to be hard, shrivelled, poor-tasting, and otherwise undesirable organoleptically. A soft, firm, pleasant tasting fruit having a higher moisture level, but still having a low water activity, would be very desirable for use in breakfast cereals and in other applications.

A number of processes have been disclosed for infusing fruit with sugar or other humectants by immersion in a concentrated aqueous solution. When the fruit's water activity exceeds that of the solution and the solution's humectant activity exceeds that of the fruit, there is diffusion of water from the fruit to the solution and diffusion of the humectant from the solution to the fruit until equilibrium is reached. An increase in humectant content lowers the water activity of the fruit by reason of the humectant's ability to "bind" water. For example, Shanbhag, U.S. Pat. No. 4,256,772, issued Mar. 17, 1981, discloses a process for preparing fruits having a moisture content of about 18 to 34 weight percent and a water activity of about 0.40 to 0.65 for use in breakfast cereals. The fruits are infused with certain solutes to attain a low water activity relative to their moisture content. Suitable solutes are edible polyhydric alcohols such as glycerol, mannitol, sorbitol, and propylene glycol, and sugars such as dextrose and sucrose. Shanbhag states that the process may be started with a fruit having a moisture content much higher than 15 weight percent and then dehydrating the fruit prior to infusion to produce an infused fruit having the desired moisture content. Example V of Shanbhag describes the infusion of commercial dehydrated peach slices.

Kahn, U.S. Pat. No. 4,390,550, issued June 28, 1983, discloses in Example II another process for infusing fruit with solutes to control its water activity at about 0.45 to 0.65. Kahn bathes the fruit in a fructose-containing corn syrup comprising about 70 to 80 percent sugar solids, about 40 to 90 percent of which is fructose.

Kahn, U.S. Pat. No. 4,350,711, issued Sept. 21, 1982, also discloses a process for infusing fruit with solutes. Kahn bathes the fruit in a series of at least two aqueous sugar solutions, the sugar in each of which comprises about 35 to 100 weight percent fructose, to gradually increase the sugar content of the fruit to about 32 to 55 weight percent. Kahn states that the gradual increase in sugar content minimizes "osmotic shock" and results in a reduced loss of volume by the fruit. Kahn teaches that the "driving force for the infusion of the sugar solutes of the infusion bath into the fruit is the osmotic pressure of the system resulting from the fact that the sugar solids concentration of the bath is greater than the water soluble solids content of the fruit prior to infusion". Kahn at col. 3, lines 3 to 8. Kahn further states that, in general, prior to infusion, the fruit is de-stemmed, the core is removed, and the fruit is washed and dried.

Another fruit infusion process is disclosed in O'Mahoney, U.S. Pat. No. 4,551,348, issued Nov. 5, 1985 and in O'Mahoney, U.S. Pat. No. 4,626,434, issued Dec. 2, 1986. O'Mahoney bathes the fruit in an aqueous sugar solution having about 30 to 84 weight percent solids, about 35 to 100 weight percent of which is fructose, which is stabilized against dilution by the addition of a concentrated sugar solution into the bath and the withdrawal of a substantially equal volume of diluted syrup. O'Mahoney states that this process enables fruit solute levels to be raised to the desired level before detrimental shrinkage of the fruit due to dehydration occurs. O'Mahoney also states that, in general, prior to infusion, the fruit is de-stemmed, the core is removed, and the fruit is washed and dried.

Agarwala, U.S. Pat. No. 4,542,033, issued Sept. 17, 1985, discloses an infusion process especially adapted for fruits having a high pectin content such as apples, pears, cherries, etc. The fruit are cooked in an aqueous sugar solution at a pH of about 1.5 to 3.75 and then cooled below their gelling point to form a gel within and between the cells of the fruit. Fructose is disclosed as a suitable sugar.

Fulger, U.S. Pat. No. 4,103,035, issued July 25, 1978, discloses a process for treating raisins and other fruit to improve their softness retention under storage conditions. The first step of the process is to contact the fruit with a hot, weak acid and then wash with water. After washing, the moisture content of the fruit is about 22 weight percent. The second step of the process is to contact the fruit with an edible polyalcohol humectant. Preferred humectants are glycerol and sorbitol. Other humectants disclosed include inverted sugar syrup. The third step is to wash with water and dry to a moisture content of about 12 to 20 weight percent. Fulger states that the acid treatment prior to contact with the humectant improves the fruit's absorption of the humectant. The treated fruit has a humectant content of about 3 to 20 weight percent. Water activities of the treated fruit are not given.

Fulger, U.S. Pat. No. 3,952,112, issued Apr. 20, 1976, discloses another process for treating raisins and other fruit to improve their softness retention under storage conditions. In place of the acid treatment step disclosed in his '035 patent, Fulger discloses a number of other procedures which improve the fruit's absorption of the humectant. In particular, Fulger teaches that the removal of air bubbles and/or fruit waxes by application of a vacuum and/or washing with a surfactant or alkali is beneficial. Fulger also teaches that absorption of humectants is improved by raising the moisture level of the fruit prior to contact with the humectant:

It has also been found that the initial moisture content of the fruit, prior to exposure to the humectant, affects the rate at which the humectant will be absorbed. In general, the higher the initial moisture content of the raisins, the faster will be the rate of absorption. It is believed that at the higher moisture levels, the moisture dissolves fruit sugars in the fruit and enables the humectant to penetrate the fruit more easily.

Fulger at col. 4, lines 24 to 31.

Bolin, H. R. et al, "Effect of Osmotic Agents and Concentrations on Fruit Quality" *Journal of Food Science* 48(1): 202-205 (1983) describes infusion of fruits in sucrose solutions and in high fructose corn syrups. Bolin et al found that the high fructose corn syrup absorbed further in the fruit than the sucrose and that fruits infused in high fructose corn syrup exhibited lower water activities than those infused in a sucrose solution.

In summary, a variety of processes for infusing fruit with fructose and other humectants have been disclosed. The primary goal of many of the processes has been to increase the rate at which the humectant is absorbed by the fruit. No known process has disclosed or suggested drying the fruit to a relatively low moisture content as a means for improving fructose absorption. On the contrary, it has been taught that moisture content should be increased prior to infusion.

SUMMARY OF THE INVENTION

The general object of this invention is to provide a sweetened fruit having a low water activity relative to its moisture content. A more particular object of this invention is to provide such a fruit which is especially suited for use in breakfast cereals.

We have discovered a process for preparing sweetened fruit having a low water activity relative to its moisture content. The process comprises: (a) obtaining a fruit; (b) drying the fruit to reduce its moisture content by at least about 50 percent; (c) bathing the dry fruit in an aqueous sugar solution having about 70 to 95 weight percent sugar, at least about 75 weight percent of which is fructose, at a temperature of about 5° to 110° C.; and (d) separating the sweetened fruit having a low water activity relative to its moisture content from the aqueous sugar solution.

We have also discovered an improved process for preparing sweetened fruit by bathing a fruit in an aqueous sugar solution, wherein the improvement comprises drying the fruit prior to bathing to reduce its moisture content by at least about 50 percent.

We have further discovered a process for preparing sweetened raisins having a low water activity relative to their moisture content. The process comprises: (a) bathing raisins having a moisture content of less than about 8 weight percent in an aqueous sugar solution having about 70 to 95 weight percent sugar, at least about 90 weight percent of which is fructose, at a temperature of about 5° to 110° C. for a sufficient length of time to increase the fructose/glucose weight ratio of the raisins by at least 15 percent and to increase the moisture content by at least 50 percent while maintaining the water activity of the raisins at less than about 0.5; and (b) separating the sweetened raisins having a low water activity relative to their moisture content from the aqueous sugar solution.

We surprisingly found that the use of a dry fruit for bathing in the aqueous sugar solution (as opposed to a moist fruit) increases the rate at which the fruit gains sugar from the solution. The increased sugar uptake, especially fructose uptake, is, in turn, believed to be primarily responsible for the fruit's low water activity relative to its moisture content. The bathed fruit's moisture content makes it softer and tastier than conventional dried fruits. The fruit's low water activity inhibits microbial spoilage and, when mixed with a cereal, decreases the transfer of water from the fruit to the cereal. The use of a dry fruit for bathing also produces energy savings in certain instances.

DETAILED DESCRIPION OF THE INVENTION

A. Dry Fruit

Any fruit capable of undergoing an osmotic exchange with an aqueous sugar solution without substantial collapse or damage to the internal cellular structure of the fruit is suitable for use in the process of this invention. Fresh fruit, as well as fruit which has been previously frozen, dehydrated, or otherwise preserved, may be employed. Illustrative fruits include apples, apricots, bananas, blackberries, blueberries, cherries, grapes, melons, peaches, pears, pineapples, plums, raisins, raspberries, and strawberries.

This invention is based, in part, on the discovery that minimizing the initial moisture content of the fruit prior to infusion maximizes the rate at which the sugar from the aqueous sugar solution infuses into the fruit. In general, it is preferred to reduce the fruit's moisture content by at least about 50 percent and most preferred to reduce the moisture content by at least about 67 percent. Fruits vary widely in their moisture contents. Table I shows the normal moisture contents of various fresh fruit, their preferred moisture contents for infusion, and their most preferred moisture contents for infusion. All moisture contents are based on the edible portion of the fruit. The data on normal moisture contents is from the composition of Foods Handbook No. 8-9 published by the U.S. Dept. of Agriculture.

TABLE I
MOISTURE CONTENTS OF FRUIT

| Fruit | Normal Moisture Content (Wt. %) | Preferred Moisture Content (Wt. %) | Most Preferred Moisture Content (Wt. %) |
|---|---|---|---|
| Apples | 84 | 42 | 28 |
| Bananas | 74 | 37 | 25 |
| Blackberries | 86 | 43 | 29 |
| Blueberries | 85 | 43 | 28 |
| Cherries | 86 | 43 | 29 |
| Grapes | 81 | 41 | 27 |
| Melons | 90 | 45 | 30 |
| Peaches | 88 | 44 | 29 |
| Pears | 84 | 42 | 28 |
| Pineapples | 87 | 44 | 29 |
| Plums | 85 | 43 | 28 |
| Raisins | 15 | 8 | 5 |

TABLE I-continued

| | MOISTURE CONTENTS OF FRUIT | | |
|---|---|---|---|
| Fruit | Normal Moisture Content (Wt. %) | Preferred Moisture Content (Wt. %) | Most Preferred Moisture Content (Wt. %) |
| Raspberries | 87 | 44 | 29 |
| Strawberries | 92 | 46 | 31 |

The fruit may also be processed in other ways before bathing to improve the speed of infusion. For example, certain fruits posses natural barriers to permeation and it is advantageous to physically pierce the barriers. Various barrier piercing techniques including peeling and slicing are described in Kahn, U.S. Pat. No. 4,350,711, issued Sept. 21, 1982, which is incorporated by reference. Another useful technique to remove permeation barriers is to rapidly freeze the fruit by the process known in the trade as the individual quick freezing ("IQF") process. This process causes the formation of relatively long and thin ice crystals which puncture the permeation barriers of the fruit without the substantial damage to the fruit's cellular structure often associated with conventional slow-freezing techniques. Permeation barrier reduction, by any of these means, is advantageously performed before drying because the barrier reduction also increases the rate of drying.

Another process optionally performed before bathing is treating the fruit to maintain its color and to avoid the well-known enzymatic browning reaction. Conventional color maintenance processes include treating the fruit with sulfur compounds (such as sodium metabisulfite), ascorbic acid, malic acid, sodium chloride, and ethylenediamine tetraacetic acid.

The method and equipment used for drying the fruit is not critical and is a matter of choice and economics. An additional advantage of using dry fruit is that it reduces or eliminates the diffusion of water from the fruit to the aqueous sugar solution which in turn, simplifies the infusion process and makes it more energy efficient. The diffusion of water from the fruit into the solution dilutes the solution and requires an adjustment of some type to maintain the sugar concentration in the solution. The most common means of adjustment is to evaporate some of the water from the solution. Removal of water from the fruit is generally easier than removing it from the solution.

B. Bathing in an Aqueous Sugar Solution

The dry fruit is infused by bathing it in an aqueous sugar solution. The term "sugar" is used to describe a carbohydrate having one, two, or more saccharose groups. In other words, the term is not used as a synonym for sucrose. Sugars suitable for use include sucrose, glucose (also known as dextrose), fructose, maltose, invert sugar, and sorbitol.

The aqueous sugar solution generally has a sugar content of about 70 to 95 weight percent. Other things being equal, the rate of infusion is generally increased as the soluble solids level is increased. However, solids levels above about 95 weight percent are difficult to achieve and to work with.

About 75 weight percent of the sugar is fructose and preferably about 90 weight percent of the sugar is fructose. Fructose is preferred for a number of reasons. First of all, fructose has a high water solubility (at 60° C. fructose can produce a 90 weight percent solution compared to sucrose's 76 weight percent) and, as explained above, this property enables the rate of infusion to be increased. Secondly, fructose has more humectancy (water-binding capacity) than other sugars. Thirdly, fructose is sweeter than other sugars and enhances flavors better than other sugars. Other things being equal, maximizing fructose content in the aqueous sugar solution minimizes water activity in the infused fruit. Accordingly, it is most preferred that substantially all the sugar in the solution be fructose.

The weight ratio of aqueous sugar solution to fruit varies from about 1:1 to about 7:1. During bathing the entire fruit is submerged. The temperature of the solution is generally about 5° to 110° C., and preferably about 20° to 80° C. The rate of infusion increases as the temperature of the solution increases. The infusion process may be performed in a batch or continuous manner. The duration of the bathing is a function of the identity and physical processing of the fruit prior to infusion, the temperature and composition of the aqueous sugar solution, and the desired end product attributes. Raisins are generally bathed for a sufficient length of time to increase their fructose/glucose weight ratio by at least 15 percent (e.g., from 1.00 to 1.15) and to increase their moisture content by at least 50 percent (e.g., from 6 weight percent to 9 weight percent). It is difficult to set corresponding endpoints for other fruits because their fructose/glucose weight ratios can change with time even without infusion and because their initial moisture contents vary widely.

Other non-sugar components are optionally present in the aqueous sugar solution. For example, the addition of about 1 to 5 weight percent of an edible calcium compound such as calcium carbonate, calcium lactate, calcium hydroxide, etc. to the solution improves the final texture of fruits, like bananas, which have a tendency of becoming overly soft or mushy. A secondary benefit to the use of calcium compounds is that it raises the pH of the aqueous sugar solution and shifts the fructose equilibrium away from the formation of difructose. Color preservation agents previously discussed such as ascorbic acid and/or malic acid are also optionally present.

C. Subsequent Processing and Uses

After bathing in the aqueous sugar solution, the infused fruit is separated from the solution and typically washed and dried to remove excess sugar solution from the surface. The fruit may be dried further if desired to obtain a certain moisture content or water activity. If desired, the fruit can be coated with an edible material such as vegetable oil or starch to improve its appearance and/or reduce its stickiness. The sweetened fruit is a useful food product by itself or may be used as a component of another food product such as breakfast cereals, baked goods, bakery dry mixes, granola bars, confections, ice cream, and dry desert mixes. Sweetened fruits having water activities below about 0.5 are especially preferred for use in breakfast cereals. Other things being equal, water activity of the fruit is reduced by: (1) reducing the moisture content; (2) increasing the total amount of humectants in the fruit; and (3) increasing the fructose percentage of the humectants.

D. Examples

These examples are illustrate only. Percentages are based on the total weight of the material unless noted otherwise.

EXAMPLE 1

This Example illustrates the effect of initial moisture content of raisins on sugar content and water activity after infusion.

Commercially available Sun-Main brand raisins (Sample A) were analyzed for moisture content, fructose and glucose content, and water activity. As shown in Table II, they had a moisture content of 14.9 weight percent, a fructose content of 34.2 weight percent, a glucose content of 33.3 weight percent, and a water activity of 0.55.

A 200 g. sample of the undried raisins were placed into a 2 l. beaker containing 1000 g. of an aqueous fructose solution (85 percent solids) at 49° C. The raisins were stirred for 6 hours. The raisins were then removed from the solution, washed with water, and dried in an oven at 38° C. for about 10 hours to remove any fructose solution on the surface of the raisins (Sample B). The raisins were then analyzed. The results are shown in Table II.

Another 200 g. sample of the Sun-Main raisins were dried in an oven at 38° C. for 21 days to reduce their moisture content by 70 percent to 4.5 weight percent (Sample C). The dried raisins were then infused using the same procedure as used with the undried raisins (Sample D). The results are shown in Table II.

TABLE II

EFFECT OF INITIAL MOISTURE CONTENT OF RAISINS

| Raisin Sample | Water Content (Wt. %) | Fructose Content (Wt. %) | Glucose Content (Wt. %) | Fructose To Glucose Ratio | Water Activity |
|---|---|---|---|---|---|
| A. Undried Before Infusion | 14.9 | 34.2 | 33.3 | 1.03 | 0.55 |
| B. Undried After Infusion | 12.7 | 37.8 | 31.7 | 1.19 | 0.46 |
| C. Pre-Dried Before Infusion | 4.5 | 38.4 | 37.4 | 1.03 | 0.28 |
| D. Pre-Dried After Infusion | 7.6 | 39.8 | 31.7 | 1.26 | 0.36 |

These results show that drying the raisins prior to infusion with an aqueous fructose solution significantly increased the ratio of fructose to glucose in the infused raisin and also significantly lowered its water activity.

EXAMPLE 2

This Example illustrates the effect of initial moisture content of bananas on sugar content and water acitivity after infusion.

The procedure of Example 1 was repeated, except as otherwise noted, with fresh, peeled and sliced bananas. The pre-dried bananas were dried to reduce their moisture content by 36 percent, from 75 weight percent water to 48 weight percent water. The aqueous fructose solution contained 2.0 weight percent asorbic acid to retard the enzymatic browning of the banana slices. The pre-dried banana slices were dried at 38° C. for 4 hours. The results are shown in Table III.

TABLE III

EFFECT OF INITIAL MOISTURE CONTENT OF BANANAS

| Banana Sample | Water Content (Wt. %) | Fructose Content (Wt. %) | Glucose Content (Wt. %) | Fructose To Glucose Ratio | Water Activity |
|---|---|---|---|---|---|
| A. Undried Before Infusion | 75 | 5.8 | 5.8 | 1.00 | — |
| B. Undried After Infusion | 11.3 | 38.4 | 12.2 | 3.15 | 0.54 |
| C. Pre-Dried Before Infusion | 48 | 12.1 | 12.1 | 1.00 | — |
| D. Pre-Dried After Infusion | 9.5 | 34.1 | 13.8 | 2.47 | 0.55 |

These results show that pre-drying bananas by 36 percent had little effect on the water activity of the infused bananas. Nevertheless, even a small amount of pre-drying improves the energy efficiency of the process by reducing the dilution of the aqueous sugar solution.

EXAMPLE 3

This Example illustrates the effect infusion with fructose has on raisins in increasing their moisture content and improving their softness at a given water activity.

A sample of dried raisins having a moisture content of 4.5 weight percent and a water activity of 0.28 (Sample C as described in Example 1) was placed on a rack in a sealed dessicant containing a saturated solution of calcium chloride such that the water activity within the dessicant was 0.33. The sample was left in the dessicant for 48 hours to allow it to equilibrate to a water activity of 0.33. After equilibration, the raisins were analyzed for moisture content and were tested for softness using an Instron Model TM Penetrometer mounted with a Kramer chamber. The Penetrometer is a commercial product of the Instron Engineering Corporation of Quincy, Mass. and measures the force required to pierce a material. The results are shown in Table IV.

A sample of pre-dried infused raisins having a moisture content of 7.6 weight percent and a water activity of 0.36 (Sample D as described in Example 1) was placed in a dessicant and allowed to equilibrate to a water activity of 0.33 as described above. The raisins were then analyzed and tested for softness as described above. The results are shown in Table IV.

TABLE IV

EFFECT OF INFUSION

| Raisin Sample | Water Activity | Water Content (Wt. %) | Penetrometer Setting (Lbs. Force) |
|---|---|---|---|
| C. Pre-Dried Before Infusion | 0.33 | 4.9 | 210 |
| D. Pre-Dried After Infusion | 0.33 | 6.7 | 165 |

These results show that infusion in a fructose solution produces a raisin which, for a given water activity, is moister and softer than a non-infused raisin.

We claim:

1. A process for preparing sweetened raisins having a low water activity relative to their moisture content, which process comprises:

(a) bathing raisins having a moisture content of less than about 8 weight percent in an aqueous sugar solution having about 70 to 95 weight percent sugar, at least about 90 weight percent of which is fructose, at a temperature of about 5° to 110° C. for a sufficient length of time to increase the fructose/glucose weight ratio of the raisins by at least 15 percent and to increase the moisture content by at least 50 percent while maintaining the water activity of the raisins at less than about 0.5; and (b) separating the sweetened raisins having a low water activity relative to their moisture content from the aqueous sugar solution.

2. The process of claim 1 wherein the sugar in the aqueous sugar solution consists essentially of fructose.

3. The process of claim 2 wherein the bathing is conducted at a temperature of about 20° to 80° C.

4. The process of claim 3 wherein the raisins have a moisture content of less than about 6 weight percent prior to bathing in the aqueous sugar solution.

5. A process for preparing sweetened fruit having a low water activity relative to its moisture content, which process comprises:

(a) obtaining a fruit;

(b) drying the fruit to reduce its moisture content by at least about 50 percent;

(c) bathing the dry fruit in an aqueous sugar solution having about 70 to 95 weight percent sugar, at least about 75 weight percent of which is fructose, at a temperature of about 5° to 110° C.; and (d) separating the sweetened fruit having a low water activity relative to its moisture content from the aqueous sugar solution.

6. The process of claim 5 wherein the sugar in the aqueous sugar solution consists essentially of fructose.

7. The process of claim 6 wherein the bathing is conducted at a temperature of about 20° to 80° C.

8. The process of claim 5 wherein the aqueous sugar solution comprises about 1 to 5 weight percent of an edible calcium compound.

9. The process of claim 5 wherein the fruit is selected from the group consisting of bananas, raisins, and strawberries.

10. An improved process for preparing sweetened fruit by bathing a fruit in an aqueous sugar solution, wherein the improvement comprises drying the fruit prior to bathing to reduce its moisture content by at least about 50 percent.

11. The process of claim 10 wherein the fruit is dried prior to bathing to reduce its moisture content by at least about 67 percent.

12. A process of claim 10 wherein said sugar solution has about 70 to 95 weight percent sugar, at least about 75 weight percent of which is fructose.

13. A process of claim 10 wherein said fruit is selected from the group consisting of bananas, raisins, and strawberries.

14. A process of claim 1 wherein said process further comprises drying said raisins prior to said bathing to reduce the moisture content of said raisins by at least about 50 percent.

15. A process of claim 14 wherein said drying reduces said moisture content by at least about 67 percent.

16. A process of claim 5 wherein said drying reduces said moisture content by at least about 67 percent.

* * * * *